United States Patent
Huffington et al.

(10) Patent No.: US 6,381,518 B1
(45) Date of Patent: Apr. 30, 2002

(54) ELECTRONIC OVEN TEMPERATURE CONTROLLER HAVING ADAPTABLE TEMPERATURE REGULATION LIMITS

(75) Inventors: Jeffrey M. Huffington, Geneva; Robert J. Alvord, Elmwood Park; John L. Courtney, Carol Stream; Kimble Vitkus, Sycamore, all of IL (US)

(73) Assignee: Ranco Incorporated of Delaware, Wilmington, DE (US)

( * ) Notice: Subject to any disclaimer, the term of this patent is extended or adjusted under 35 U.S.C. 154(b) by 0 days.

(21) Appl. No.: 09/376,031

(22) Filed: Aug. 17, 1999

Related U.S. Application Data

(60) Provisional application No. 60/097,165, filed on Aug. 19, 1998.

(51) Int. Cl.⁷ ............................................... G05D 23/00
(52) U.S. Cl. ....................... 700/299; 700/300; 700/211; 700/207; 219/497; 374/149
(58) Field of Search ................................. 700/299, 300, 700/207, 211; 219/497; 702/130–136; 374/100, 137, 149

(56) References Cited

U.S. PATENT DOCUMENTS

| | | | | |
|---|---|---|---|---|
| 4,288,854 A | * | 9/1981 | Burroughs | 700/300 |
| 4,301,509 A | * | 11/1981 | Haase et al. | 700/300 |
| 4,484,050 A | * | 11/1984 | Horinouchi et al. | 219/10.55 |
| 5,023,431 A | * | 6/1991 | Roberge | 219/494 |
| 5,278,394 A | * | 1/1994 | Morino | 219/497 |
| 5,596,514 A | * | 1/1997 | Maher, Jr. et al. | 700/306 |
| 6,018,150 A | * | 1/2000 | Maher, Jr. | 219/497 |

* cited by examiner

Primary Examiner—William Grant
Assistant Examiner—Ronald D Hartman, Jr.
(74) Attorney, Agent, or Firm—Jules Jay Morris

(57) ABSTRACT

An oven temperature controller for regulating temperature to a temperature setpoint over a temperature range in an oven compartment comprising a microprocessor and memory storage means. The memory storage means stores temperature setpoint related information for temperature setpoints over the temperature range and this information is used by the microprocessor for establishing an upper control limit curve and a lower control limit curve. The upper control limit curve and lower control limit curve have no discontinuities over a majority of the temperature range and at least one of these curves is non-parallel to a temperature setpoint line, the temperature setpoint line formed in a stepwise linear manner between temperature setpoints as the temperature setpoint is varied over the temperature range.

30 Claims, 8 Drawing Sheets

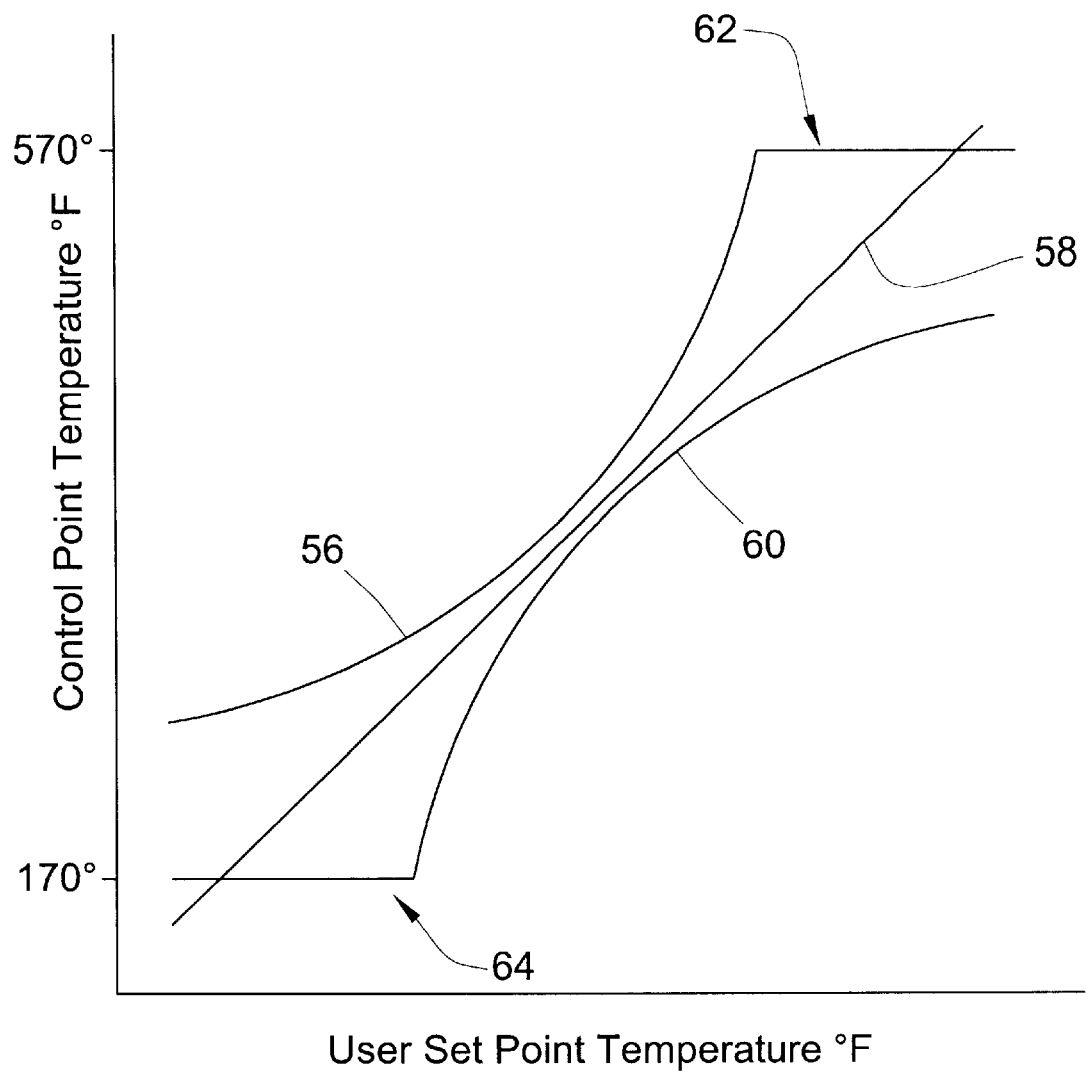

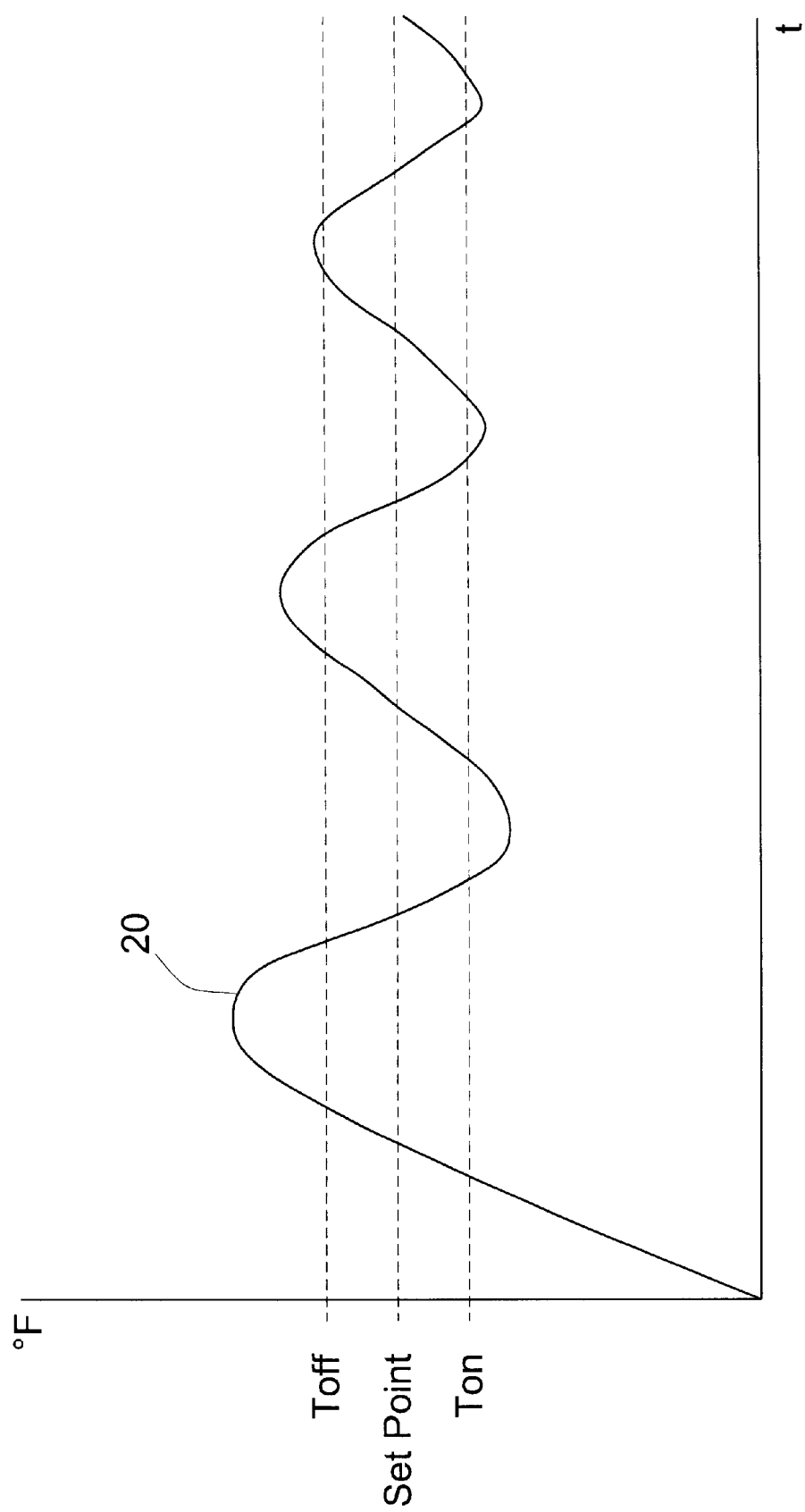

ated within the electronic controller. As with their electromechanical counterparts, a linear hysteresis band of approximately 20 F. was used throughout the set point band defined by line 10 of FIG. 6. Unfortunately, utilizing a linear hysteresis band results in a large percent error at lower cooking temperatures, e.g. a 20 F. band at the 170° F. setting equates to a percent effort of +/−6%, while at the setting of 550° F. it equates to only a +/−2% error.

ELECTRONIC OVEN TEMPERATURE CONTROLLER HAVING ADAPTABLE TEMPERATURE REGULATION LIMITS

CROSS-REFERENCE TO RELATED PATENT APPLICATIONS

This application claims the benefit of U.S. Provisional Application No. 60/097,165, filed Aug. 19, 1998.

FIELD OF THE INVENTION

The instant invention relates to oven temperature control, and more particularly to electronic controllers and temperature sensors for controlling same.

BACKGROUND OF THE INVENTION

The maintenance of a consistent cooking temperature has long been a problem which has plagued appliance engineers, gourmet chiefs, and homemakers alike. The variation of temperature within the oven cavity from the center to the walls, as well as the variation of temperature over time during a cooking cycle may result in inconsistent cooking behavior. As an example, cake which should be cooked at 350° F. for 20 to 25 minutes may be nearly burned one time at 18 minutes, and may still be wet after 28 minutes another time. This problem is a result of many factors including the size of the oven cavity, the placement of the temperature sensor within the cavity, the type of heat source (gas versus electric), the amount of insulation used in the construction of the oven, convection currents within the cavity, as well as the sensor characteristics themselves.

Recognizing that some of these factors are beyond the appliance engineer's control, efforts were made to design a mechanism of temperature sensing and burner control which would minimize temperature variation within the cavity due to controller induced changes. In the past, oven temperature controllers utilized electromechanical controls which included at least one hot thermostat within the cavity which controlled the relays or solenoids which supplied the fuel (gas or electric) to adjust oven temperature. This control was a simple ON/OFF type control which operated the burners to maintain the sensed temperature within a hysteresis band defined, in large part, by the hysteresis of the temperature sensing element itself. Such a temperature control band is illustrated in FIG. 6.

As may be seen with reference to FIG. 6, the set point line 10 indicates the desired temperature as set by the user. However, because the temperature sensor and control included hysteresis, the oven temperature control would actually not turn the burners off until the temperature had risen beyond the set point by a given hysteresis amount as illustrated by the line 12. Once the burner control had turned off the burners, the interior temperature within the oven begin to fall. Unfortunately, due once again to hysteresis of the temperature sensing and control circuitry, the interior temperature would be allowed to fall beyond the set point 10 to a point along the line 14. Once the temperature had fallen below line 14, the burners would again be turned on and the temperature would begin to rise. This temperature rise would continue until line 12 was reached, and the cycle would continue. The temperature hysteresis band of these early oven temperature controls was typically as wide as 20° F., and was fairly constant for all temperature settings.

As electronic controls were introduced to appliance design, the operating characteristics of the electromechanical temperature control, including the hysteresis band, were emulated within the electronic controller. As with their electromechanical counterparts, a linear hysteresis band of approximately 20 F. was used throughout the set point band defined by line 10 of FIG. 6. Unfortunately, utilizing a linear hysteresis band results in a large percent error at lower cooking temperatures, e.g. a 20 F. band at the 170° F. setting equates to a percent effort of +/−6%, while at the setting of 550° F. it equates to only a +/−2% error.

Recognizing this large disparity in the percentage error resulting from emulating the electromechanical sensors of the past, the next generation of electronic oven temperature controllers utilized a stepped turn on hysteresis limit 16 as illustrated in FIG. 7. This stepped lower limit 16 allowed for the percent error allowed over the entire cooking cycle to be lowered to a more acceptable level. These next generation electronic controllers utilized three (3) to four (4) discrete lower limits as illustrated by line segments, 16A, 16B, and 16C, resulting in three to four discrete hysteresis bands. Typically, these bands were set to 5° F., 10° F., and 15° F. for a three zone implementation, and to 5° F., 10° F., 15° F., and 20° F. for a four zone implementation. These discrete hysteresis zones greatly improved the cooking performance of the ovens in which these controllers were installed, especially when cooking delicate foods such as pastries, etc.

However, the non-linear nature of this lower hysteresis limit has also resulted in cooking control problems. Specifically, since a discontinuity exists between different cooking zones (e.g. defined by the upper hysteresis limit 12 and the first segment 16A, the upper limit 12 and the second segment 16B, and the upper limit 12 and the third segment 16C), inconsistent cooking performance was observed when the oven was set at a temperature near the end point of two zones. This inconsistent cooking performance is a result of the controller oscillating between the two adjacent control zones of lower limit 16. Attempts to stabilize this problem through software coding have met with limited success due to the limited code space available and the cost restraints imposed by the highly competitive appliance industry. As a result, this problem remains.

In addition to this problem, these next generation electronic controllers also suffer from a similar problem relating to initial turn on of the oven. When the oven is first turned on and a temperature is set by the user, the cavity temperature begins to climb. It is known in the oven art that the oven temperature will continue to climb once the burners are turned off during this initial pre-heat phase as illustrated by temperature curve 20 of FIG. 9. Because of this effect, the controller utilizes a separate preheat turn off limit as illustrated in FIG. 8 as line $18_P$ or $18_{NP}$. The position of this preheat turn off limit $18_P$ or $18_{NP}$ in relation to the normal control hysteresis limits 12, 16 shown in FIG. 7 varies depending on many factors, including whether the oven is a pyro type (see line $18_P$) or a non-pyro type (see line $18_{NP}$).

Because a pyro type oven includes a self-cleaning cycle which raises the interior temperature to approximately 900° F., it includes much more insulation than a non-pyro type oven which does not include a self cleaning cycle. Because of this increased insulation, the pre-heat turn off limit $18_P$ is typically lower than the pre-heat turn off limit $18_{NP}$ in a non-pyro oven, and may be below the steady state burner turn on limit 16 of FIG. 7. In a non-pyro type oven, the pre-heat turn off limit $18_{NP}$ may actually be above the steady state turn off limit 12 shown in FIG. 7 to allow for the increased need to heat the walls of the oven (which contain relatively little insulation compared to a pyro type oven). In any event, the pre-heat turn off limit $18_P$ or $18_{NP}$ is set to minimize temperature overshoot and maximize temperature settling time within the steady state temperature control band 12, 16 of FIG. 7.

However, the non-linear nature of this pre-heat turn off limit $18_P$ or $18_{NP}$ has also resulted in cooking control problems. Specifically, since a discontinuity exists between different cooking zones (e.g. in FIG. 7 defined by the upper hysteresis limit 12 and the first segment 16A, the upper limit 12 and the second segment 16B, and the upper limit 12 and the third segment 16C), the pre-heat limit $18_P$ or $18_{NP}$ was also discontinuous. These discontinuities also resulted in inconsistent pre-heating performance when the oven was first turned on and set at a temperature near the end point of two zones. As with the above, this inconsistent pre-heating performance is a result of the controller oscillating between the two adjacent pre-heat zones of lower limit $18_P$ or $18_{NP}$. Attempts to stabilize this problem through software coding have met with limited success, also due to the limited code space available and the cost restraints imposed by the highly competitive appliance industry. As a result, this problem also remains.

BRIEF SUMMARY OF THE INVENTION

It is therefore an object of the invention to overcome these and other problems existing in the art. More particularly, it is an object of the instant invention to provide a new and improved electronic controller for oven temperature control which overcomes the above and other problems existing in the art. Specifically, it is an object of the instant invention to provide an electronic oven temperature controller which minimizes the software coding and expense for temperature control while increasing the performance and consistency of the temperature control. It is a further object of the instant invention to allow for individual oven characterization of the temperature control limits. It is an additional object of the instant invention to allow for re-characterization of the temperature control limits, both in absolute value and in shape. It is a further object of the instant invention to allow for re-programming of the temperature control limits.

These and other aims, objectives, and features of the invention will become more apparent from the following detailed description when taken in conjunction with the accompanying drawings.

BRIEF DESCRIPTION OF THE DRAWINGS

FIG. 4 is a graphical illustration of additional exemplary control curves appropriate for use in an embodiment of the instant invention;

FIG. 9 is a graphical representation of oven temperature during initial preheat representing the necessity for a separate preheat control curve.

Figure 1:
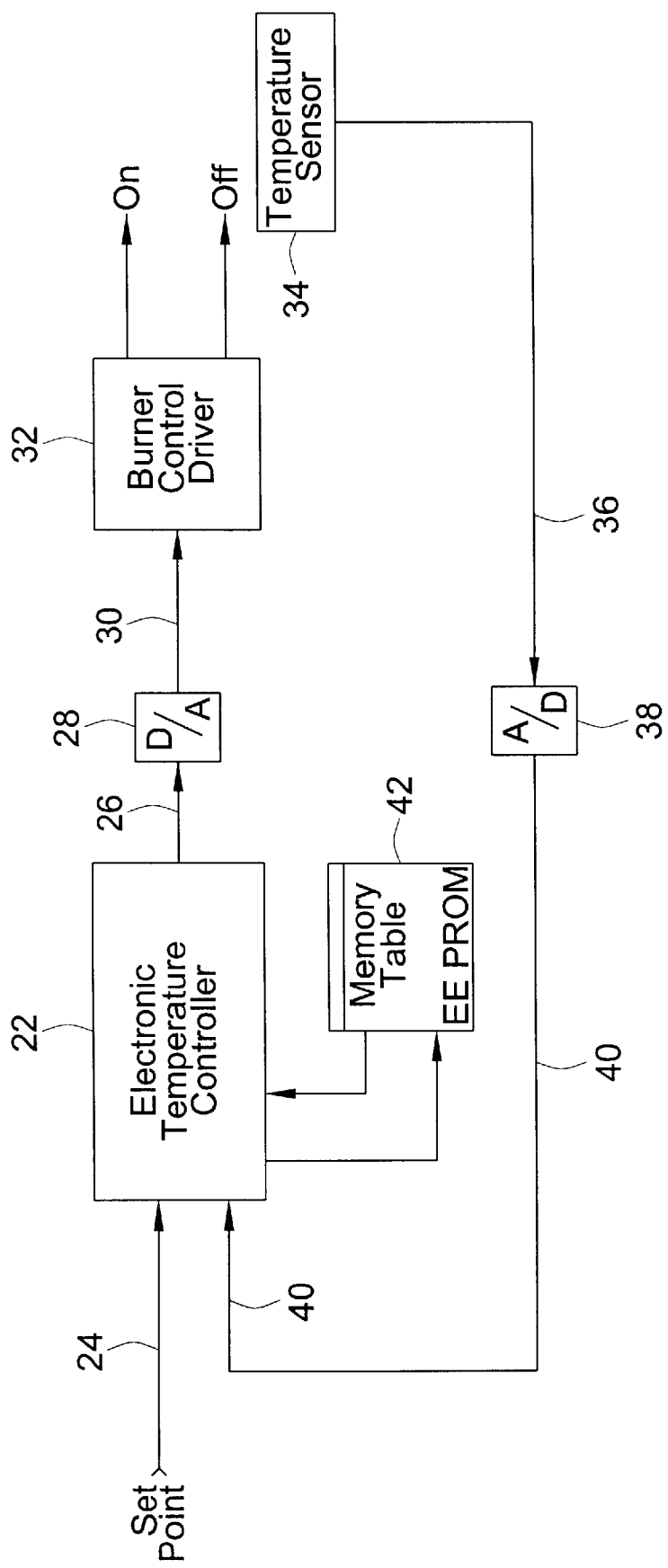
FIG. 1 is a block diagrammatic illustration of a preferred embodiment of an electronic oven temperature controller of the instant invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE INVENTION

A preferred embodiment of the instant invention is illustrated in block diagrammatic form in FIG. 1. As may be seen from this Figure, the oven temperature controller of the instant invention comprises an electronic temperature controller 22 which receives as an input the set point 24 as selected by a user. The input circuitry to the set point 24 may be a standard potentiometer type temperature selector whose analog input is converted to digital form for processing by the electronic temperature controller 22 by analog to digital circuitry (not shown). Additionally, the set point temperature input 24 may be programmed digitally by a touch pad of other appropriate means as will be recognized by one skilled in the art. The electronic temperature controller 22 may be a standard industrial 4 or 8 bit microprocessor, although more powerful microprocessor may also be utilized, bounded mainly by cost considerations in the highly competitive appliance industry.

The output 26 from the electronic temperature controller 22 is preferably converted from digital to analog form by the digital to analog converter 28. The converted burner control signal on line 20 is used to control the burner control driver 32 to turn the burner on or off. As will be recognized by one skilled in the art, the burner control driver 32 may be of any conventional type appropriate for driving the particular technology burner on and off. For example, the burner control driver 32 may be an electronic relay driver control circuit which, in a conventional fashion, closes and trips an electrical control relay for supplying electric power to the burner elements in an electric range. As will also be recognized by one skilled in the art, the burner control driver 32 may also be a solenoid driver which opens and closes a gas supply valve to allow gaseous fuel to flow in a gas range. Additionally, one skilled in the art will recognize that, depending on the burner control driver 32 input circuitry requirements, the digital to analog converter 28 may not be needed. Indeed, the particular use of the output burner control signal 26 is not dependent on, nor should be limited by the particular technology which ultimately utilizes this signal to control the burner element.

A preferred embodiment of the instant invention also includes a temperature sensor 34 which is placed preferably within the oven cavity to sense the interior temperature thereof. This temperature sensor may be of any known technology, so long as its sensing accuracy is within the ultimate control limits demanded by a customer specification. The output 36 of temperature sensor 34 may preferably be converted to digital form by analog to digital converter 38 for use by the electronic temperature controller 22. However, depending on the particular implementation of the electronic temperature controller 22, the necessity of having analog to digital converter 38 may be removed. In the preferred embodiment of the instant invention, however, the output 40 of analog to digital converter 38 is used by the electronic temperature controller 32 as a temperature feedback for use in its temperature control algorithm. One skilled in the art will recognize that the electronic temperature controller 22 may implement various control architectures including proportional, proportional integral (PI), proportional integral derivative (PID), etc. depending on the desired complexity and response of the system. However, because the temperature variation within the oven cavity of a typical oven varies at a relatively slow rate, a simple proportional feedback control loop may be implemented by the electronic temperature controller 22.

Also as may be seen from this Figure, the electronic temperature controller 22 preferably utilizes a memory table 42 to provide control parameter inputs for use in controlling the oven temperature. While any type memory device may be utilized as element 42, a preferred embodiment of the instant invention utilizes an electrically erasable programmable read-only memory (EEPROM). The use of an EEPROM allows rapid prototyping and control algorithm modification without the need of removing the memory device 42. However, one skilled in the art will recognize that less expensive memory devices may be utilized in a mass production environment to reduce cost.

Figure 2:
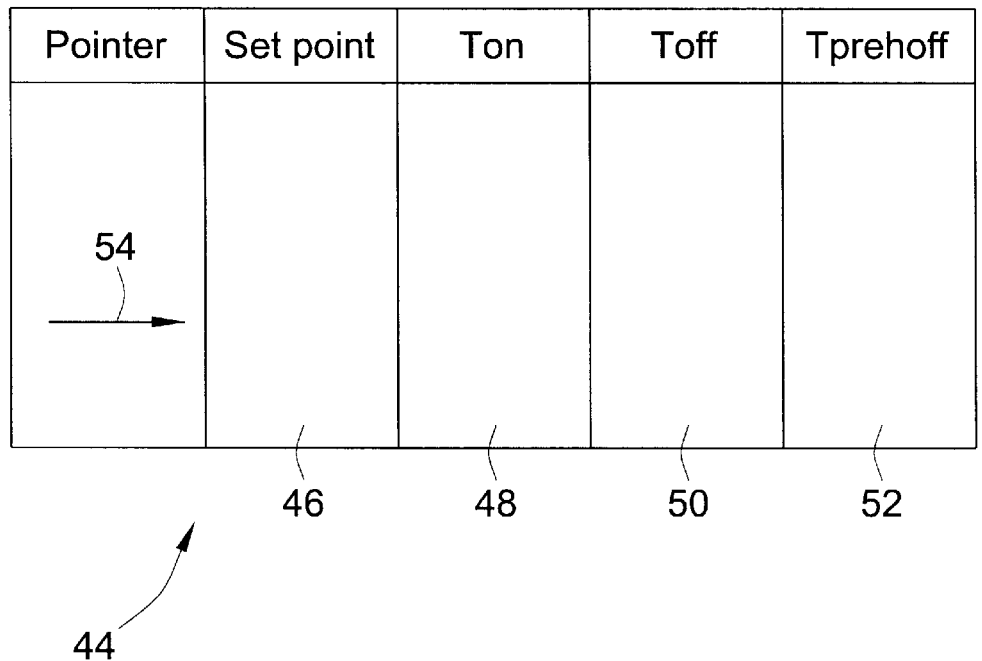
FIG. 2 is a tabular representation of a memory storage table utilized in a preferred embodiment of the instant invention.

An exemplary memory storage table is illustrated in tabular structure form in FIG. 2. As may be seen, the memory storage table 44 would coordinate the set point input 46 with the control parameters for the turn on temperature 48, the turn off temperature 50, and the pre-heat turn off temperature 52. As this Figure illustrates, a pointer 54 would select a particular set point 46 as determined from the user input 24 (See FIG. 1). Once selected, the data from the corresponding row would be returned to the electronic temperature controller 22 to be utilized in setting the turn on temperature, the turn off temperature, and in, the case of initial pre-heating, the pre-heating temperature turn off point of the particular user set point. The electronic temperature controller 22 would then use these various control parameters, along with the temperature feedback signal 40 to generate the burner control signal output 26. By utilizing such a lookup table 44, the electronic temperature controller 22 can effectuate a piece wise linear upper and lower temperature limit to control the oven temperature. Additionally, since both the control parameters for the turn on and turn off temperature are stored within the table 44, distinct individual curves for the turn on and turn off limits may be stored.

Figure 3:
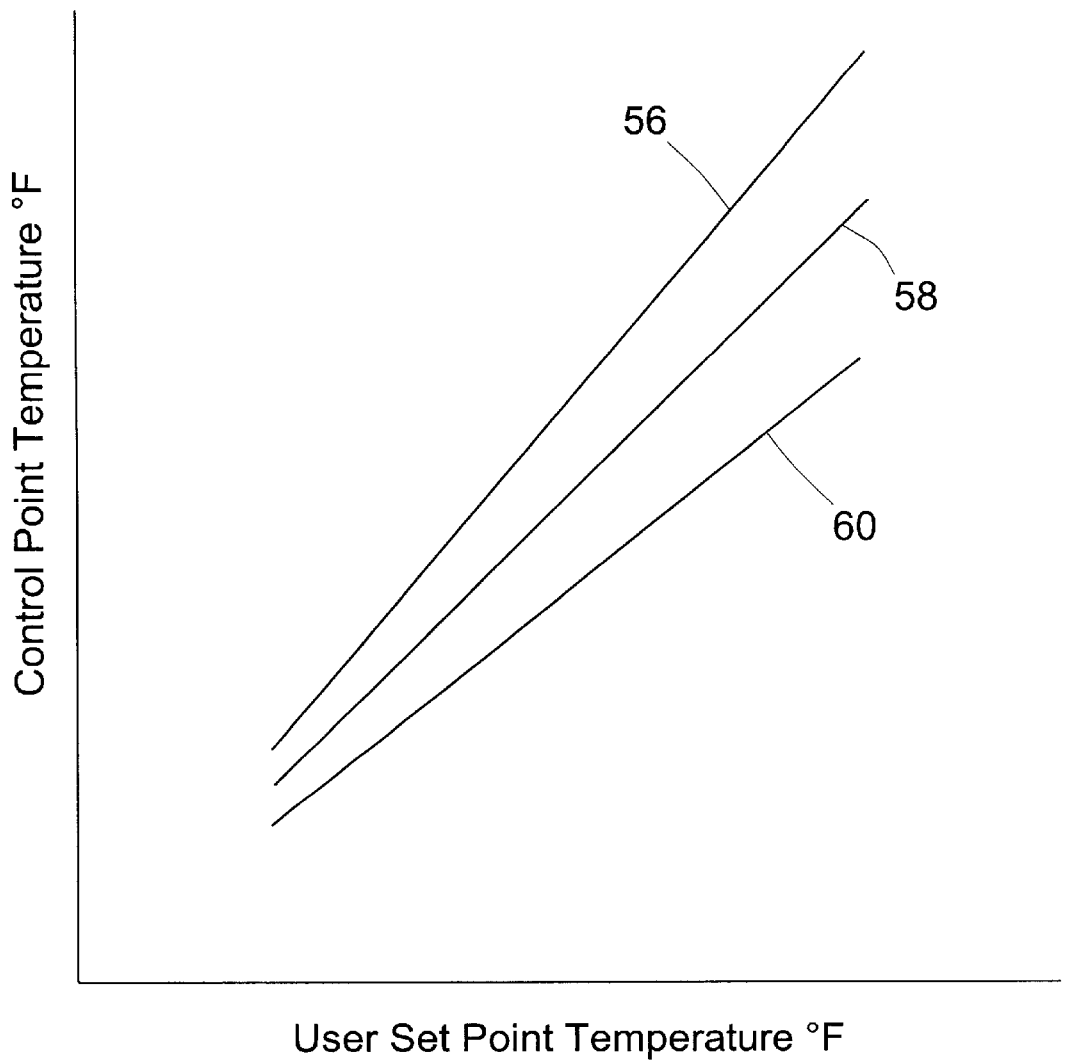
FIG. 3 is a graphical illustration of exemplary control curves appropriate for use in an embodiment of the instant invention.
Figure 6:
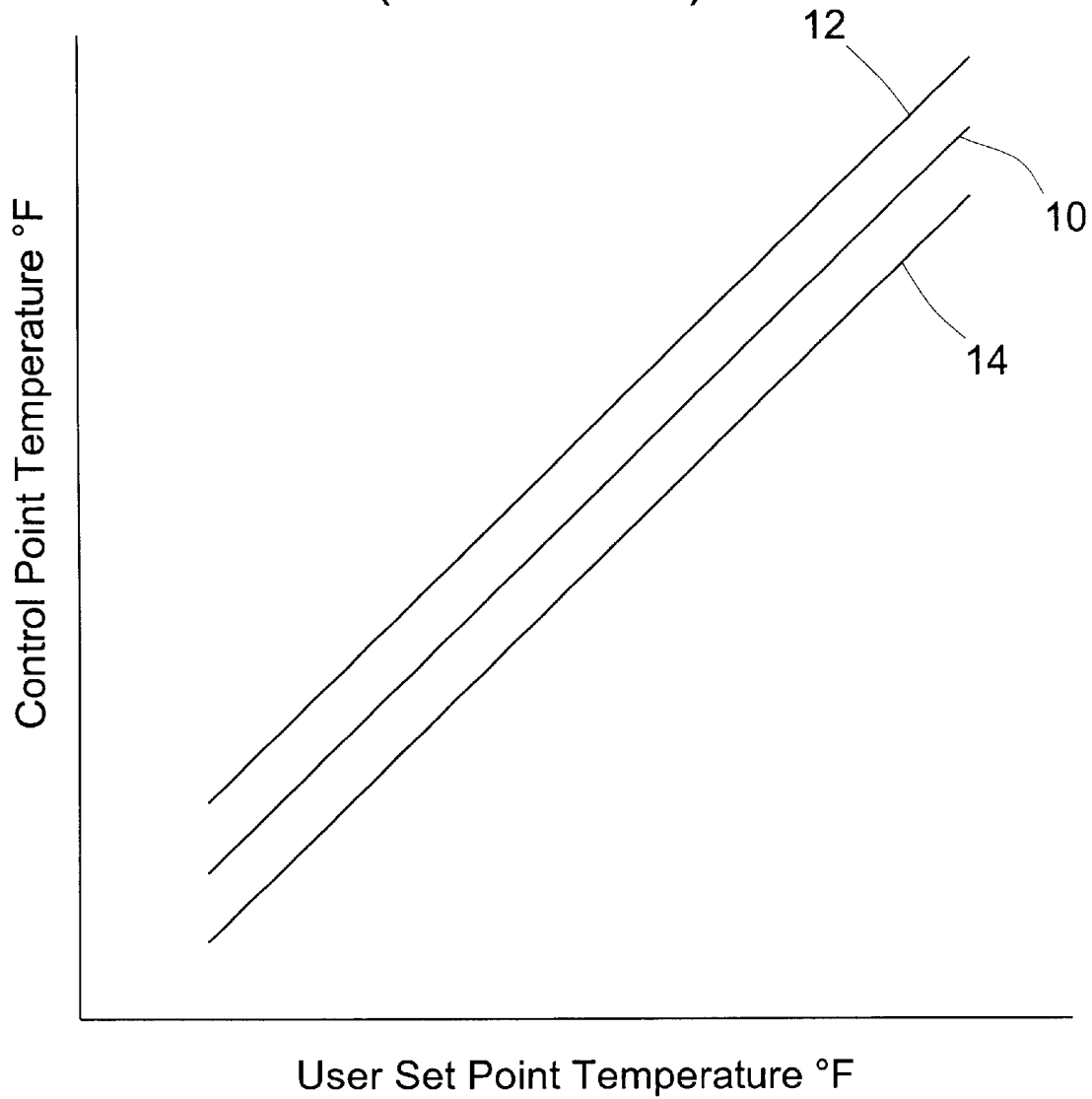
FIG. 6 is a graphic representation of control curves typical for electromechanical and prior electronic oven controllers.

Unlike conventional systems which utilize an upper temperature hysteresis limit which is a straight parallel line offset from the temperature set point, the control system of the instant invention allows both the upper and lower hysteresis limits to be varied as desired. One such possibility is illustrated in graphical form in FIG. 3. As may be seen, the upper hysteresis limit 56 varies from the temperature set point 58 in a non-parallel fashion. Additionally, the lower hysteresis limit 60 also varies in a stepwise linear, non-parallel fashion from the temperature set point 58. By utilizing the system of the instant invention, the controller is able to maintain a proportional percent error throughout the entire temperature selection range.

Figure 7:
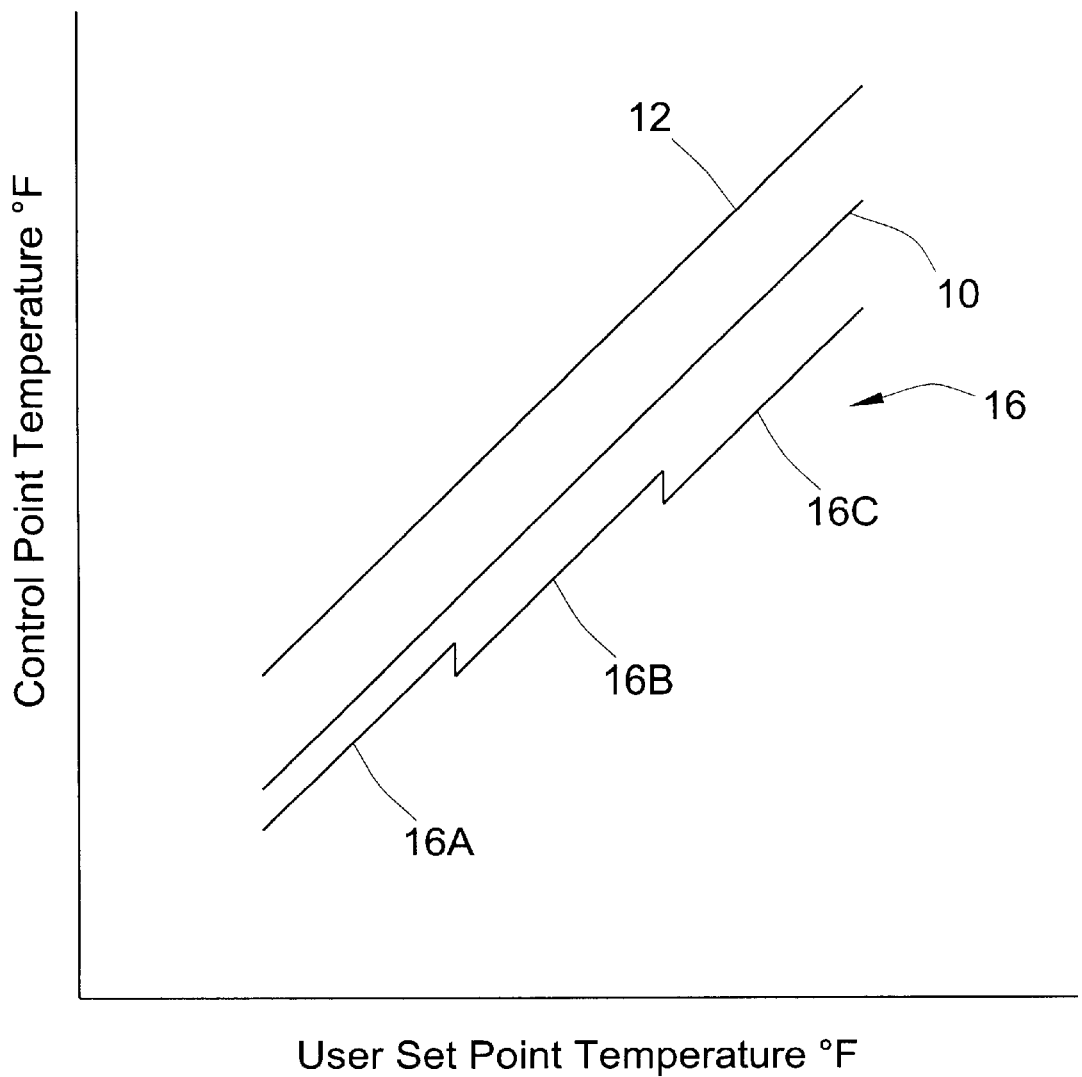
FIG. 7 is a graphical representation of control curves utilized by next generation electronic controllers.

Additionally, since the lookup table may contain a vast number of points, the number of which is limited solely by the resolution of the analog to digital converter used to condition the inputs utilized by the electronic temperature controller 22 and by the physical memory size of the memory table 42, a nearly continuous limit may be obtained. This overcomes the serious problem existing in the prior art when a temperature is selected very near a control limit discontinuity as illustrated in FIG. 7. This method also allows for control parameter limits to be instituted within the table 44. Specifically, and with reference to FIG. 4, the upper control limit 56 may include a region 62 which will turn off the burner regardless of increasing temperature set point. For example, an upper limit safety region may be instituted at 570° F. Likewise, a lower temperature safety limit, as illustrated by region 64 on lower temperature limit 60 may also be instituted. For example, a minimum temperature allowance of 170° may be instituted to prohibit the growth of bacteria, regardless of further decreases of the temperature set point 58.

Figure 8:
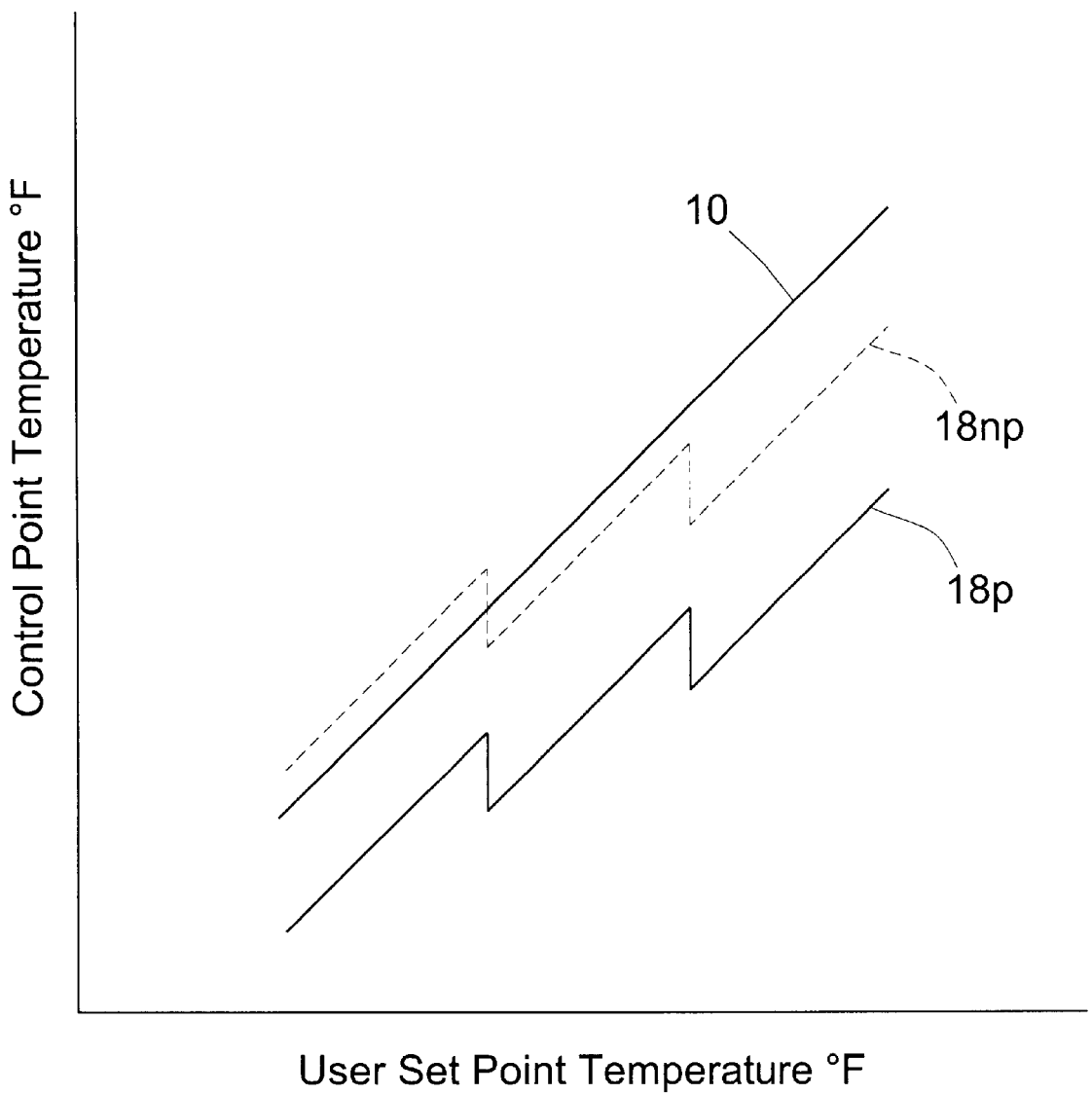
FIG. 8 is a graphical representation of exemplary preheat control curves for pyro and non-pyro type ovens.

The curves illustrated in FIG. 4 also illustrate the flexibility of the system of the instant invention in determining acceptable temperature bands over the selector temperature range. Specifically, FIG. 8 illustrates that the upper temperature turn off limit 56 and the lower temperature turn on limit 60, in addition to including temperature safety regions 62, 64, also provide a region of very small variance from the temperature set point 58. This type of controller temperature hysteresis may be useful over the temperature range utilized in baking delicate foods such as pastries, etc., where larger temperature variations may damage or otherwise ruin the dish.

Figure 5:
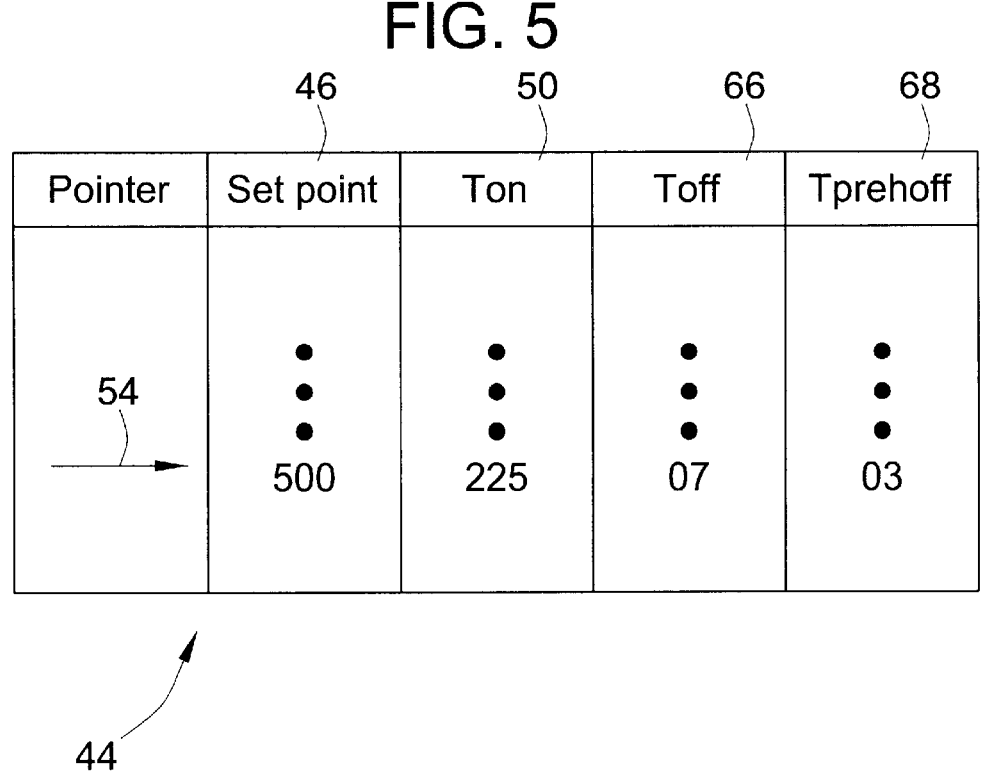
FIG. 5 is a tabular representation of an alternate memory storage table utilized in a preferred embodiment of the instant invention.

An alternate embodiment of the table 44 is illustrated in FIG. 5. In this particular embodiment, which utilizes less memory than the embodiment illustrated in FIG. 2, only the upper temperature turn off limit points are stored in column 50. Instead of storing the actual temperature turn on limit data and the pre-heat temperature turn off data in the table, an amplitude column 66 an a pre-heat offset column 68 are utilized. In this way, the electronic temperature controller receives values for the temperature turn off point, an amplitude and pre-heat offset value which must be combined with the temperature turn off point to determine the lower temperature turn on limit and the pre-heat offset limit. An exemplary set of values are included in FIG. 5 for the pointer 54 designating the set point temperature of 500° F. The numbers illustrated in the table 44 in the row corresponding to a set point temperature of 500° F. are the analog to digital numbers to be used by the electronic temperature controller 22 with the temperature feedback analog to digital converted signal 40. As illustrated, the $T_{off}$ value stored in table 44 is 225. The $T_{on}$ value would then be calculated by subtracting the number stored in column 66 from the number stored in column 50, i.e. 225−0.7=218. The value stored in the pre-heat offset column 68 is the analog to digital bit which is multiplied by a constant and subtracted from the value stored in the $T_{off}$ column 50 to arrive at the pre-heat temperature turn off limit. As illustrated in this Figure, the calculation yields 225−(03×5)=210. A preferred embodiment of the instant invention utilizes temperature set points in column 46 which vary by 5° F. steps, and which may be read to approximately 1° F. accuracy.

The values stored in lookup table 44 may be individually measured during a calibration cycle, or may be interpolated between measured points on the oven sensor curve. These measured points can be adjusted at calibration to reflect the individual oven characteristics and, through the use of an EEPROM, reflected into the individual lookup table 44 for that particular oven. This results in a nearly continuous, smoothed representation of the oven characteristics for enhanced temperature control avoiding the large discontinuities of the prior control system. Additionally, both the upper temperature and lower temperature control limits may be varied in any fashion desired to allow accommodation of customer requirements throughout the entire cooking temperature range.

An alternate embodiment of the instant invention utilizes online calculation of the upper and lower temperature control points for any selected temperature set point. In this embodiment, a lookup table of discreet points along the curve is not required, but is replaced by the storage of the equations defining the upper and lower control curves.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may be varied substantially without departing from the spirit of the invention, and exclusive use of all modifications that come within the scope of the appended claims is reserved.

What is claimed is:

1. An oven temperature controller for regulating temperature to a temperature setpoint over a temperature range in an oven compartment, the oven temperature controller having a temperature setpoint line formed in a stepwise linear manner between temperature setpoints as the temperature setpoint is varied over the temperature range, the oven having an oven heating means to controllably heat the oven and an oven compartment temperature indication means to provide an indication of oven compartment temperature, the temperature controller comprising:

a microprocessor having an output heat control signal controlling an oven heating means an input setpoint signal for receiving a user settable temperature setpoint and an input temperature line for receiving an indication of oven temperature from the oven heating means;

memory storage means in communication with said microprocessor;

said memory storage means storing temperature setpoint related information for temperature setpoints over the temperature range, said setpoint related information used by said microprocessor for establishing an upper control limit and a lower control limit that vary from the temperature setpoint;

said upper control limit and said lower control limit forming an upper control limit curve and a lower control limit curve as the temperature setpoint is varied over the temperature range, said upper control limit curve and said lower control limit curve having no discontinuities over a majority of the temperature range, at least one of said upper control limit curve and said lower control limit curve being non-parallel to the temperature setpoint line over a majority of a temperature range;

said microprocessor providing said memory storage means with the temperature setpoint, said microprocessor thereby acquiring said setpoint related information relative to the temperature setpoint;

and said microprocessor thereby regulating the oven compartment temperature to temperatures between said upper control limit curve and said lower control limit curve in response to the temperature setpoint and the oven compartment temperature indication means.

2. The oven temperature controller of claim 1 wherein a first variation between said upper control limit and said temperature setpoint is a first percentage of the temperature setpoint and a second variation between said lower control limit and the temperature setpoint is a second percentage of the temperature setpoint.

3. The oven temperature controller of claim 2 wherein at least one of said first variation and said second variation is changed at each temperature setpoint.

4. The oven temperature controller of claim 1 wherein said lower control limit is varied by said microprocessor in response to a change in the temperature setpoint to form a lower control limit curve that is non parallel to the temperature setpoint line as the temperature setpoint is varied over the temperature range.

5. The oven temperature controller of claim 1 wherein said upper control limit is varied by said microprocessor in response to a change in the temperature setpoint to form an upper control limit curve that is non parallel to the temperature setpoint line as the temperature setpoint is varied over the temperature range.

6. The oven temperature controller of claim 1 wherein said setpoint related information includes turn-off temperature, a turn-on temperature, and a pre-heat turn-off temperature, said pre-heat turn-off temperature is used by said microprocessor to sufficiently control temperature overshoot and temperature settling time in the oven compartment during an initial turn-on of the oven.

7. The oven temperature controller of claim 1 wherein said setpoint related information includes a turn-off temperature, an amplitude value, and a pre-heat offset value, said microprocessor calculating a turn-on temperature based on said turn-off temperature and said amplitude value and calculating a pre-heat turn-off temperature based upon said turn-off temperature, said pre-heat turn-off temperature is used by said microprocessor to sufficiently control temperature overshoot and temperature settling time in the oven compartment during an initial turn-on of the oven.

8. The oven temperature controller of claim 7 wherein said turn-on temperature is calculated by said microprocessor by subtracting said amplitude value from said turn-off temperature.

9. The oven temperature controller of claim 7 wherein said pre-heat turn-off temperature is calculated by said microprocessor by multiplying said pre-heat offset value by a constant to form a multiplied pre-heat value and subtracting the multiplied pre-heat offset value from said turn-off temperature.

10. The oven temperature controller of claim 1 wherein said upper control limit includes an upper limit safety region, said microprocessor outputting on said output heat control signal an off signal whenever the temperature setpoint is in said upper limit safety region.

11. The oven temperature controller of claim 1 wherein said lower control limit includes a lower temperature safety limit wherein said microprocessor maintains said lower control limit at said lower temperature safety limit when the temperature setpoint is below said minimum temperature.

12. The oven temperature controller of claim 1 wherein said lower control limit and said upper control limit includes a region where a first difference between said upper control limit and the temperature setpoint and a second difference between said lower control limit and the temperature setpoint are sufficiently small to prevent delicate foods from being damaged from temperature variations.

13. The oven temperature controller of claim 1 wherein said setpoint storage information comprises equations for calculating said upper control limit and said lower control limit.

14. The oven temperature controller of claim 1 wherein said memory storage means is an electrically erasable programmable read-only memory.

15. An oven temperature controller for regulating temperature to a temperature setpoint over a temperature range in an oven compartment, the oven temperature controller having a temperature setpoint line formed in a stepwise linear manner between temperature setpoints as the temperature setpoint is varied over the temperature range, the oven having an oven heating means to controllably heat the oven and an oven compartment temperature indication means to provide an indication of oven compartment temperature, the temperature controller comprising:

a microprocessor having an output heat control signal controlling an oven heating means, an input setpoint signal for receiving a user settable temperature setpoint and an input temperature line for receiving an indication of oven temperature from the oven heating means;

memory storage means in communication with said microprocessor;

said memory storage means storing temperature setpoint related information for temperature setpoints over the temperature range, said setpoint related information used by said microprocessor for establishing an upper control limit and a lower control limit that vary from the temperature setpoint;

said upper control limit and said lower control limit forming an upper control limit curve and a lower control limit curve as the temperature setpoint is varied over the temperature range, said upper control limit curve and said lower control limit curve having no discontinuities over a majority of the temperature range, at least one of said upper control limit curve and said lower control limit curve being non-parallel to the temperature setpoint line over a majority of a temperature range;

said upper control limit includes an upper limit safety region, said microprocessor outputting on said output control signal an off signal whenever said temperature setpoint is in said upper limit safety region;

said lower control limit includes a lower temperature safety limit, said microprocessor maintaining said lower control limit at said lower temperature safety limit when the temperature setpoint is below said lower temperature safety limit;

said microprocessor providing said memory storage means with the temperature setpoint, said microprocessor thereby acquiring said setpoint related information relative to the temperature setpoint; and said microprocessor thereby regulating the oven compartment temperature to temperatures between said upper control limit curve and said lower control limit curve in response to the temperature setpoint and the oven compartment temperature indication means.

16. The oven temperature controller of claim 15 wherein a first variation between said upper control limit and said temperature setpoint is a first percentage of the temperature setpoint and a second variation between said lower control limit and the temperature setpoint is a second percentage of the temperature setpoint.

17. The oven temperature controller of claim 16 wherein at least one of said first variation and said second variation is changed at each temperature setpoint.

18. The oven temperature controller of claim 15 wherein said lower control limit is varied by said microprocessor in response to a change in the temperature setpoint to form a lower control limit curve that is non parallel to the temperature setpoint line as the temperature setpoint is varied over the temperature range.

19. The oven temperature controller of claim 15 wherein said upper control limit is varied by said microprocessor in response to a change in the temperature setpoint to form an upper control limit curve that is non parallel to the temperature setpoint line as the temperature setpoint is varied over the temperature range.

20. The oven temperature controller of claim 15 wherein said setpoint related information includes a turn-off temperature, a turn-on temperature, and a pre-heat turn-off temperature, said pre-heat turn-off temperature is used by said microprocessor to sufficiently control temperature overshoot and temperature settling time in the oven compartment during an initial turn-on of the oven.

21. The oven temperature controller of claim 15 wherein said setpoint related information includes a turn-off temperature, an amplitude value, and a pre-heat offset value, said microprocessor calculating a turn-on temperature based on said turn-off temperature and said amplitude value and calculating a pre-heat turn-off temperature based upon said turn-off temperature, said pre-heat turn-off temperature is used by said microprocessor to sufficiently control temperature overshoot and temperature settling time in the oven compartment during an initial turn-on of the oven.

22. The oven temperature controller of claim 21 wherein said turn-on temperature is calculated by said microprocessor by subtracting said amplitude value from said turn-off temperature.

23. The oven temperature controller of claim 21 wherein said pre-heat turn-off temperature is calculated by said microprocessor by multiplying said pre-heat offset value by a constant to form a multiplied pre-heat offset value and subtracting the multiplied pre-heat offset value from said turn-off temperature.

24. A method of regulating temperature to a user settable temperature setpoint over a temperature range in a compartment for cooking food, the method comprising the steps of:

providing an indication of oven temperature to a microprocessor;

deriving an upper control limit curve and lower control limit curve in relation to a user settable temperature setpoint, said upper control limit curve and said lower control limit curve having no discontinuities over a majority of the temperature range, at least one of said upper control limit curve and said lower control limit curve being non-parallel over a majority of a temperature range to a temperature setpoint line formed in a stepwise linear manner between temperature setpoints as the temperature setpoint is varied through the temperature range; and regulating the oven temperature to temperatures between said upper control limit curve and said lower control limit curve.

25. The method of claim 24 further comprising the step of changing said upper control limit curve and said lower control limit curve to maintain a first difference between said upper control limit curve and the temperature setpoint to a first percentage of the temperature setpoint and a second difference between said lower control limit curve and the temperature setpoint to a second percentage of the temperature setpoint.

26. The method of claim 24 further comprising the step of varying said lower control limit curve from the temperature setpoint to form a lower control limit curve that is non parallel to the temperature setpoint line.

27. The method of claim 24 further comprising the step of varying said lower control limit curve from the temperature setpoint to form a lower control limit curve that is non parallel to the temperature setpoint line.

28. The method of claim 24 further comprising the step of providing an upper limit safety region where said microprocessor maintains the oven temperature below said upper limit safety region.

29. The method of claim 24 further comprising the step of providing a lower temperature safety region where said microprocessor maintains the oven temperature above said lower temperature safety region when the temperature setpoint is in said lower temperature safety region.

30. The method of claim 24 further comprising the step of maintaining a first difference between said upper control limit and the temperature setpoint and a second difference between said lower control limit and the temperature setpoint to be sufficiently small to prevent delicate foods from being damaged from temperature variations.

* * * * *

UNITED STATES PATENT AND TRADEMARK OFFICE
CERTIFICATE OF CORRECTION

PATENT NO. : 6,381,518 B1
DATED : April 30, 2002
INVENTOR(S) : Huffington et al.

It is certified that error appears in the above-identified patent and that said Letters Patent is hereby corrected as shown below:

Column 8,
Line 10, after "includes", insert -- a --

Signed and Sealed this

Fifteenth Day of October, 2002

Attest:

Attesting Officer

JAMES E. ROGAN
Director of the United States Patent and Trademark Office